United States Patent [19]
Bauer

[11] 3,790,119
[45] *Feb. 5, 1974

[54] ENERGY STORING DEVICE, PARTICULARLY A BLOCKABLE PNEUMATIC SPRING

[76] Inventor: Fritz F. Bauer, Schulzstrasse 14, 8503 Altdorf B. Nbg., Germany

[ * ] Notice: The portion of the term of this patent subsequent to Apr. 18, 1989, has been disclaimed.

[22] Filed: Aug. 31, 1971

[21] Appl. No.: 176,533

[52] U.S. Cl. .............................. 248/400, 248/161
[51] Int. Cl. .......................................... F16m 11/00
[58] Field of Search ........ 248/404, 161, 400, 188.7; 297/345, 347, 349; 188/300

[56] References Cited
UNITED STATES PATENTS
3,656,593   4/1972   Bauer .................................. 188/300

Primary Examiner—Marion Parsons, Jr.
Attorney, Agent, or Firm—Borwdy and Neimark

[57] ABSTRACT

An energy storing device for installation in a column base for height adjustable furniture provided with a member having a conical aperture attached to the piece of furniture, a cone provided at the upper end of the device for frictional engagement with the aperture, a release pin extending into said member, the cone being formed in one piece on the housing of the device and having a transition zone between the external conical part and the housing.

5 Claims, 4 Drawing Figures

ENERGY STORING DEVICE, PARTICULARLY A BLOCKABLE PNEUMATIC SPRING

The present invention relates to an energy-storing device, and more particularly to a blockable pneumatic spring for installation e.g. in a column base for height-adjustable furniture. The device is provided with a conical flanged collar or a shell-design hub with a conical bore or the like, on the underside of a piece of furniture, e.g. a seat, table plate or the like, for friction-contact engagement of a cone provided at the upper end of the energy-storing device and penetrated by a release pin or an extension thereto.

A conical connection of this kind between the height-adjustable part of a piece of furniture and the energy-storing device, usually received in a column base with the release pin or its extension above, has proven to be quite feasible and is used mainly in height-adjustable furniture, since only the cone of the energy-storing device need be inserted into the conical bore of the support provided on the height-adjustable part of the furniture and is held by friction contact so that it cannot rotate. A conical link of this type, e.g. between the seat of a chair and the appropriately mounted column base, is also used out of purely economical considerations when no energy-storing device at all is used. In the present case, however, only height-adjustable furniture will be considered, in which an energy-storing device with a conical connection is provided between the height-adjustable and fixed sections of the furniture.

In the previously known cone connections of highly diverse design, the cone is clamped, screwed or otherwise fastened to the upper end of a vertically mounted energy-storing device, on a plug that seals the housing. Hence, the fastening cone and energy-storing device have previously consisted of two parts. However, an embodiment of this kind necessitates a relatively high manufacturing cost as well as a not insignificant material expenditure, because the fastening cone to which the end turned toward the energy-storing device or the upper plug is fastened must be made in the form of a regular collet or a screw-type collet, and the upper end of the housing or its plug on an energy-storing device provided for height adjustment must be appropriately fitted and/or formed. In addition, only the upper end of the housing and/or the plug is thickened, so that a suitable space must be provided in the base for the thickened upper end.

Accordingly, an object of the present invention is to provide a known energy-storing device with a cone provided at the top to serve as a support for the height-adjustable part of a piece of furniture in such a fashion that the upper end has the same diameter as the housing of the energy-storing device.

According to the invention, this problem is solved in the following manner. The cone is shaped to provide a friction-contact fit in a conical bore in a special flanged rim or in the conical bore of a shell-type hub on the bottom of the height-adjustable part, in one piece with the plug sealing the housing and/or the housing of the energy-storing device, and having a transition zone between the externally conical part and the plug and/or housing of the energy-storing device. The transition zone between the conical part of the fixing cone and the plug and/or housing, which fits with frictional contact into the conical bore of the flanged rim of the crossbar, shell-type hub or the like can be made in the form of a truncated cone. For a special case, when the housing is made of plastic, the release pin or its extension (which is axially displaceable in the fixing cone and is centrally mounted) is conducted through the lengthwise end faces of the radial ribs to the inner surface of the cone, which has a much greater diameter than the release pin and/or its extension.

By making the plug and/or housing and cone in a one-piece design, the energy-storing device becomes much cheaper to make and simpler to install. In addition, the connection between the height-adjustable part of a piece of furniture, especially a chair, is made more reliable because a connection is eliminated. In energy-storing devices of larger dimensions, with a housing or plug made from plastic by stamping or injection-molding, the cone is made in the form of a hollow core and the release pin and/or its extension are guided centrally from the inner surfaces by radial ribs. This saves material and simultaneously ensures a good sliding ability of the release pin and/or its extension. The cone-shaped transition zone also produces a high degree of rigidity between the cone and plug and/or housing, so that the energy-storing device can accept large loads.

Two examples of embodiments of an energy-storing device made in accordance with the invention are explained below, as illustrated in the drawings. In the drawings, there is shown a purely schematic representation of the following:

Figure 1:
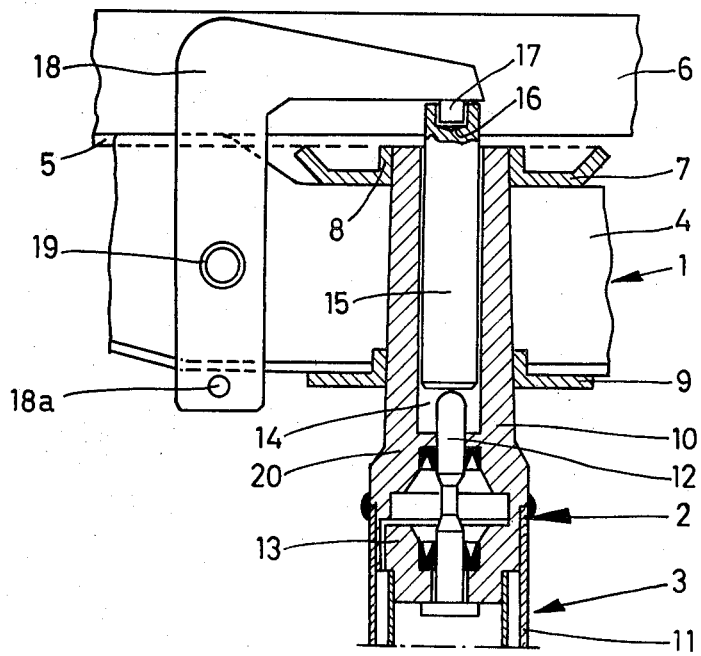
FIG. 1 is a vertical sectional view through the connection of the height-adjustable part of an article of furniture with the upper part of a vertical energy-storing device (e.g., inserted in a column base) and is an example of a first embodiment of the invention.
Figure 2:
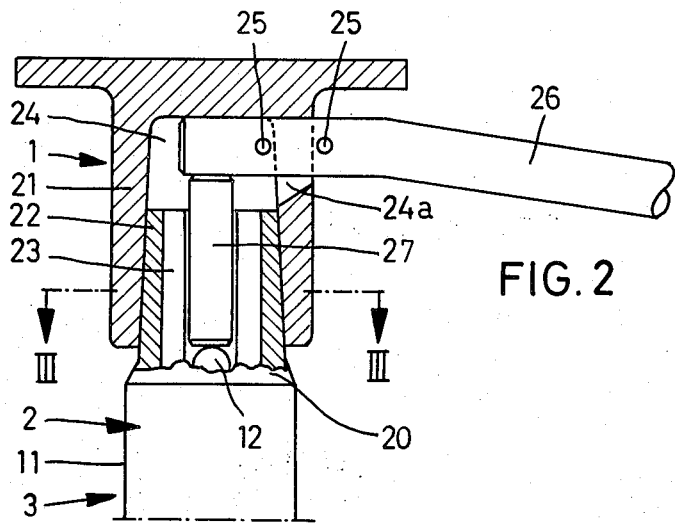
FIG. 2 is a vertical sectional view corresponding to FIG. 1 of a second embodiment of the invention.

In the embodiments shown in FIGS. 1 and 2, only the carrier 1 is shown for a height-adjustable piece of furniture, the carrier being fastened to the bottom of a height-adjustable part of the piece of furniture, which may be, for example, a table plate or the seat of a chair, and with this carrier being in releasable frictional contact with the upper end 2 of an energy-storing device 3. The energy-storing device 3 is mounted vertically, for example, in a column base according to FIG. 4. The load of the height-adjustable part of the piece of furniture is reliably transmitted to the energy-storing device (which may be in the form of a pneumatic spring) and thence to the column base.

In the embodiment according to FIG. 1, the carrier 1 is made of a shell-type hub 4 open at the top, fastened by means of a flange 5 that extends along its opening, to the underside of the height-adjustable part of the piece of furniture, e.g., to the seat 6 of a chair or the table plate of a table. The shell-type hub 4 is crossed diagonally by a crossbar 7, which connects the side walls of the hub and has a conical bore in the transverse center, lengthened by a shoulder 8. At the bottom of the hub 4, coaxial to the conical bore of the crossbar, is a flanged bushing 9 with a flange pressed against the lower portion of the base, which also has a conical bore. The two conical bores in crossbar 7 and flanged bushing 9 have a conical shape which corresponds to that of a cone 10 that fits into the bores. The cone 10 is provided on the upper end of the energy-storing device 3 and forms an extension of a plug 13 that seals the upper end of housing 11 and guides the release pin 12. The fastening cone 10 is formed in one piece by deep-drawing, for example, and has an axial bore 14. In the embodiment according to FIG. 1, a bolt 15 which is axially displaceable is mounted in this bore 14 to lengthen the release pin 12. The bolt 15 extends upwardly from the shoulder 8 of crossarm 7 somewhat further than the length of the stroke of the release pin 12 and accepts at its end, in an axial hole 16, a centering pin 17 of an operating handle 18. By depressing the operating handle 18, the blockage of the energy storing device is removed. The handle 18 is made in the form of a bell crank, having a long side thereon and a short side, that pivots around pivot point 18a, by means of a handle that is not shown in FIG. 1 and which fits into a hole 19 in the long side.

Between the fastening cone 10, which fits with frictional contact into the conical opening of the shell-type hub 4, and the upper end of the energy-storing device housing 11 and/or the plug 13, there is a truncated-cone-shaped transition zone 20, to ensure high rigidity between the plug 13 and the fastening cone 10, despite the low material expenditure.

Figure 3:
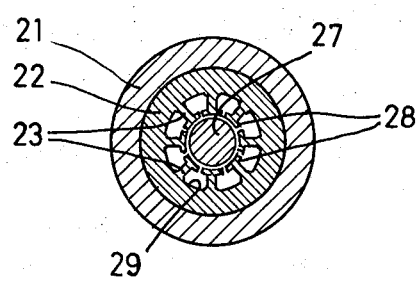
FIG. 3 is a cross sectional view taken along line III—III in FIG. 2.

The example of the embodiment according to FIGS. 2 and 3 differs from the previous embodiment only in the fact that instead of a shell-type hub, a flanged rim 21 is provided, and the fastening cone 22, which forms a single piece with the plug, is made in the form of a hollow collar. This fastening cone 22 is provided with lengthwise-extending and radially arranged internal ribs 23. The conical bore 24 in the flanged rim 21 can be a blind hole, in which the free upper end of the fastening cone 22 is located at a distance from the bottom of the conical bore 24 of the flanged rim 21. This distance roughly corresponds to the thickness of a hand lever 26 which is mounted in an opening 24a in the wall of the flanged rim 21 between two cross-pins 25 including the stroke of the release pin 12 and/or its extension 27. The inner end of the handle 26 rests on the adjacent end surface of the extension 27, so that by raising the handle 26 the extension 27 is depressed, thus releasing the blockage of the energy-storing device, which is in the form of a pneumatic spring.

In contrast to the preceding embodiment, the extension 27 extends between the inner surfaces 28 of the radial ribs 23, which are formed on the inner surface 29 of the fastening cone 22 which is in the form of a hollow collar, see FIG. 3. This design reduces the expenditure of materials and ensures a good sliding ability, since some of the friction between the inner surfaces 28 can be reduced in this fashion.

The piece, made in one section, consisting of a plug 13 and/or housing 11 and fastening cone 10 and/or 22, can be made from metal, especially light alloy, or a tough elastic plastic of great strength. Manufacture is by injection molding or transfer molding, so that the piece can be made ready to install and requires practically no further finishing.

Figure 4:
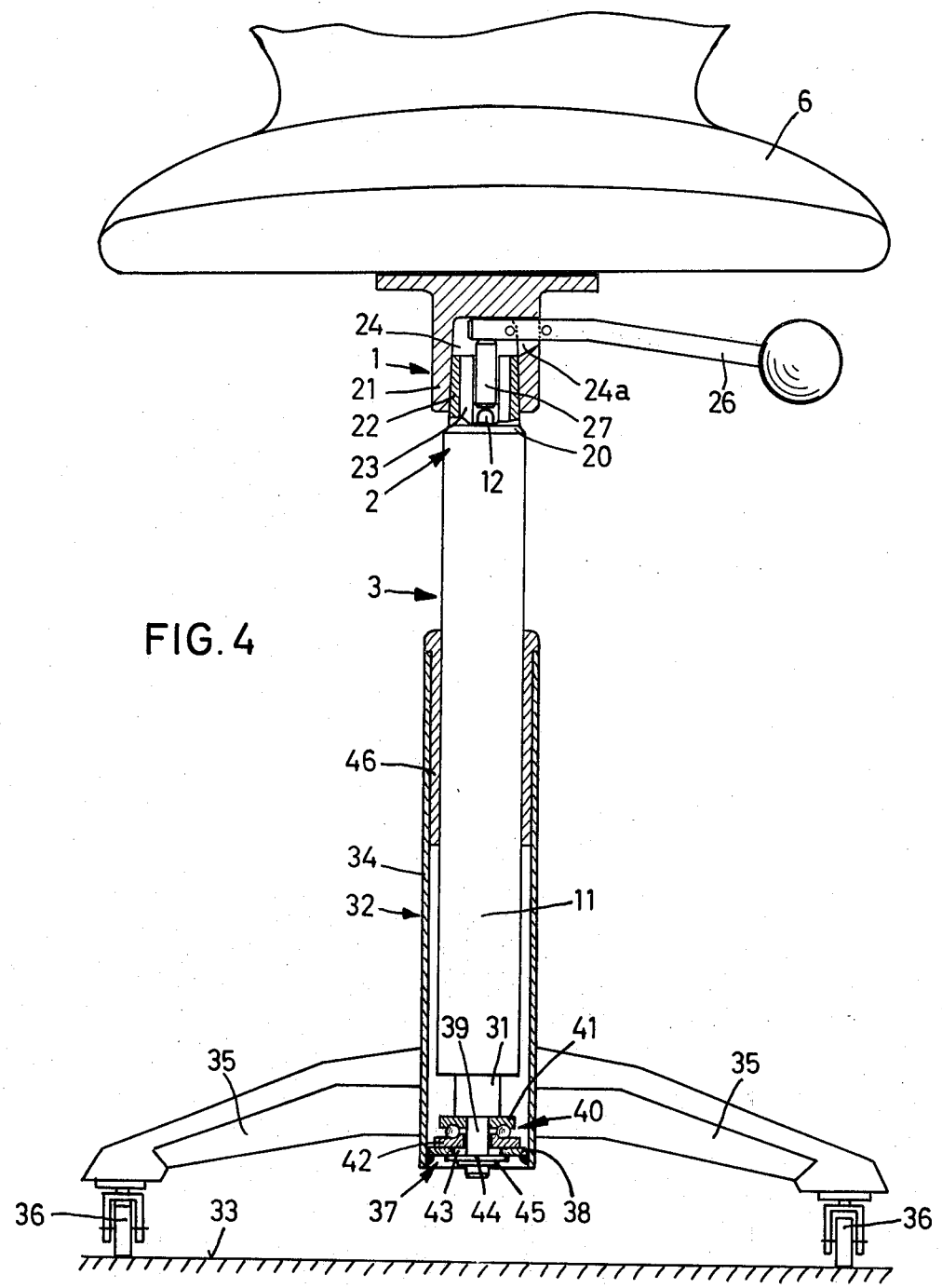
FIG. 4 shows a chair equipped with an energy-storing device according to this invention with a conical connection provided corresponding to the embodiment of FIGS. 2 and 3.

In the chair shown in FIG. 4, an energy storing device 3 is provided, which is not in itself the subject of the invention. The piston rod 31 of this pneumatic spring extends out of the lower end of the housing 11 through sealing means. An axially displaceable release pin 12 extends from the upper end of the housing through sealing means and serves for actuating a valve that locks the rod in a set position. A pneumatic spring of this type is the subject of my U. S. Pat. No. 3,656,593. The housing of this pneumatic spring is of strong construction, since it consists of two concentrically disposed steel tubes. At the same time, a by-pass passage is provided that can be shut off by the valve, and serves to connect a space above the piston with a space below the piston. As a result of the double-shell construction of the housing, this pneumatic spring is particularly suitable for the height adjustment of structures such as chair seats, stove seats and the like, since as a result of its stability the housing 11 can serve directly as the chair column, in an economical manner.

In the illustrated embodiment, the pneumatic spring is received in a chair base 32. Such a chair base is formed by a guide tube 34 onto which radially extending support arms 35 are fixed, as by welding at the lower region of its exterior, the guide tube extending perpendicularly to the floor 33 and axially slidably carrying the pneumatic spring 3. A roller 36 may be provided at the free end of each support arm 35, for example, a caster roller which can swing in a circular path about a vertical axis. Alternatively, of course, devices may be provided for equalizing possible unevennesses in the floor. The lower end of the guide tube 34 is provided with a base 37 in which the free end of the piston rod 31 is axially non-displaceably but laterally fixed.

The manner of fixing the lower end of the piston rod can be accomplished in various ways. According to FIG. 4, the base 37 of the guide tube 32 is formed by a welded-in thick annular disk 38, the diameter of whose central opening is considerably greater than the diameter of the studlike end 39 of the piston rod 31. A thrust bearing 40 is arranged on the stud 39, its upper race 41 being press-fitted onto the stud so as to bear against the step formed between the stud and the main body of the piston rod. The lower race 42, on the other hand, bears against the inner side of the base 37 constituted by the annular disk 38. For axially non-displaceably mounting the stud 39 in the base 37, the opening 43 of the annular disk 38 is covered from the outside of the base by an annular disk 44 which is seated on the stud 39 practically without play, and is secured by means of a spring ring 45. The spring ring 45 engages in an annular groove of the stud, which is provided at such a spacing from the main body of the piston rod, which corresponds to the total thickness of the thrust bearing 40, the base 37 and the outer annular disk 44. Thus, the stud 39 of the piston rod is axially non-displaceably but nevertheless laterally movably anchored in the base 37 of the guide tube 34 and can readily participate in the swivelling movement of the chair seat. The housing 11 of the pneumatic spring 3 can slide up and down axially directly in the guide tube 34 with little play. Preferably, however, a bushing 46 (for example, of plastic) is provided between the guide tube of the chair base, stool base or the like and the housing of the pneumatic spring, the upper end of the bushing being provided with a collar which closes off or masks the upper wall edge of the guide tube, if desired.

The upper attachment of the pneumatic spring 3 to the seat 6 of a chair is accomplished in the form and manner already shown in FIG. 2 and appropriately described in the description.

It will be obvious to those skilled in the art that various changes may be made without departing from the scope of the invention and the invention is not to be considered limited to what is shown in the drawings and described in the specification.

What is claimed is:

1. In a lifting device for height-adjustable furniture comprising: an energy storing fluid spring means including a cylinder, a piston for axial movement in said cylinder, and a valve at one end of the cylinder for the flow of fluid into and out of said cylinder according to the movement of said piston, said valve comprising a plug sealing said one end of the cylinder and an axially displaceable release pin, the improvement comprising a cone provided at the upper end of said energy storing fluid spring means for frictional attachment to a female socket at the underside of a furniture element intended to be height adjusted, said cone being integral with said plug, said cone having a decreasing diameter from its bottom upwardly of shape complementary to the shape of the female socket of the furniture element, and said release pin extending centrally through said cone, and a transition zone extending between the external portions of said cone and said plug.

2. A device according to claim 1 wherein said transition zone is in the form of a truncated cone.

3. A device according to claim 1 wherein said cone has an aperture therein adapted to receive and guide the axial displacement of said release pin.

4. A device according to claim 3 wherein the surface of the aperture in said cone comprises a plurality of radial ribs thereon adapted to guide the axial displacement of said release pin.

5. A device according to claim 3 wherein a lever is provided for releasing said release pin.

* * * * *